United States Patent Office 3,011,470
Patented Dec. 5, 1961

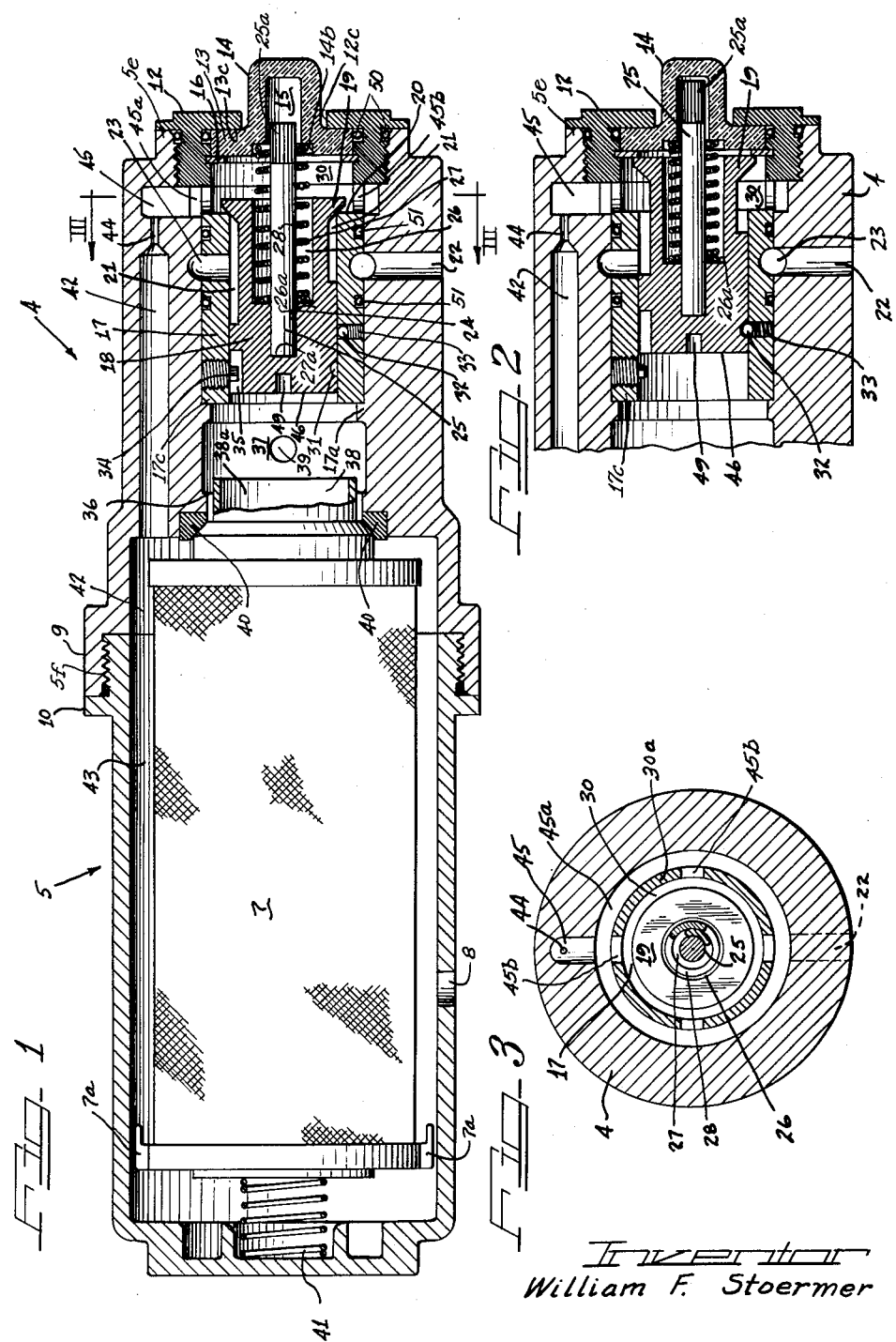

3,011,470
PRESSURE CHANGE INDICATOR
William F. Stoermer, Grafton, Ohio, assignor to Thompson Ramo Wooldridge Inc., Cleveland, Ohio, a corporation of Ohio
Filed Mar. 18, 1960, Ser. No. 15,853
11 Claims. (Cl. 116—117)

This invention relates to a method and means for indicating differential pressure conditions in pressurized fluid flow apparatus and is more directly concerned with a novel method and device for visual indication of pressure conditions in such fluid flow apparatus.

By employment of my invention, wherein is provided a device for visual inspection and indication of malfunction caused by pressure changes in such apparatus with the features of positive locking of the device in the malfunction warning position and the by-passing of the pressurized fluid from the fluid operated equipment, simple and effective means are provided for controlling pressure operated equipment.

It is therefore among the objects of the present invention to provide means for indicating differential pressure changes resulting from unknown causes in pressure operated equipment.

It is another object of the present invention to provide means for locking the differential pressure indicating device in the malfunction warning position until positive steps are taken to unlock the device.

It is still another object of the present invention to provide a differential pressure indicating device which is adapted to visually indicate change in pressure conditions.

It is a further object of the present invention to provide a differential pressure indicating device combining the features of positive locking, visual indication of change in pressure conditions and by-passing of the pressure medium from the pressure operated equipment.

It is a still further object of the present invention to provide means operatively responsive to pressure conditions in pressure operated equipment to indicate pressure changes in said equipment.

Yet another object of the present invention is to provide a novel method for preventing malfunction of pressure operated equipment.

These and other objects, features and advantages of the present invention will become more apparent during the course of the following description, particularly when considered in conjunction with the accompanying drawings wherein like reference characters and numerals refer to like or corresponding parts throughout the several views.

On the drawings:

FIGURE 1 is a view in longitudinal section of a preferred form of differential pressure indicating means constructed in accordance with the principles of my invention.

FIGURE 2 is a partially broken view of a portion of the device of FIGURE 1 but showing the pressure indicating device of my invention locked in the visual indicating position.

FIGURE 3 is a cross-sectional view taken along lines III—III of FIGURE 1.

Briefly stated, the present invention is directed to a differential pressure indicating device which is adapted for use with pressure operated equipment, is movably responsive to change in pressure conditions in said equipment for positioning the indicating member for visual inspection, said member being locked in the visual indicating position until positive steps are taken to unlock the member, and which, in the visual indicating position, permits by-passing of the pressure fluid medium to prevent possible malfunction of the equipment.

As appears in FIGURE 1, a pressure indicating device, generally indicated by the reference numeral 4, is shown in assembled relation with a filter housing 5 positioned in a pressurized fluid flow line of pressure operated equipment (not shown). It will be appreciated that pressure indicating devices constructed in accordance with the principles of my invention may be adapted for employment with any type of pressure operated equipment.

A filter 7 provided with a plurality of spacers 7a is shown positioned in the filter housing 5 communicating with a fluid flow outlet 8 to permit discharge of filtered fluid medium. The filter may be any type of well known filter element.

The differential pressure indicator housing 4 has a raised annular flange 9 at one end inwardly threaded for engagement with complementary threads 5f of the filter housing 5. When assembled, the differential pressure indicator housing abuts the shoulder provided by a raised external annular flange 10 of the filter housing 5.

At its opposite end 5e, differential pressure indicator housing 4 is in threaded engagement with a centrally apertured end plate 12 which is internally recessed and adapted to receive in abutting relation an outturned annular flange 13 of a transparent member 14 which projects through the central aperture 12c of end plate 12. Transparent member 14 is provided with an internal chamber 15 for purposes hereinafter described. A retaining ring 16 is employed to positively seat transparent member 14 against the internal shoulder 13c provided by the end plate flange 13.

The chamber 30 defined by the pressure indicator housing 4 has a cylindrical sleeve 17 slip-fitted therein which abuts at one end 17c the internal annular stop 17a of the pressure indicator housing 4.

Positioned within sleeve 17 is a coaxial, elongated, slidable member 18 having a flanged end 19 adapted to engage a shoulder 20 defined by the end of sleeve 17.

Inwardly of the flanged end 19, slidable member 18 is provided with an external annular recess 21 communicating with a by-pass outlet 22 through an annular passage 23 defined by sleeve 17 and housing 4.

Centrally located in member 18 is an axial bore 24 for receiving and securely positioning an indicating stem element 25 which may be appropriately brightly colored at end 25a to serve as the visual indicating element.

The member 18 is also provided with an axially extending annular recess 26 to provide a seat 26a for compression springs 27 and 28 which also seat in recesses 14b formed in the transparent member 14.

Thus compression springs 27 and 28 urge the flanged end 19 of the slidable member 18 against the shoulder 20 defined by the end of the sleeve 17 to block communication between the annular chamber or recess 21 and the chamber 30 defined by the flanged end of the slidable member 18 and the end plate 12.

Inwardly of its opposite end 46, slidable member 18 is provided with a cammed recess or groove 31 adapted to receive a detent 32 normally held against a compression spring 33 by the member 18.

An index pin 34 may be provided to assure proper replacement of the parts, should it become necessary to disassemble the indicating device. For this purpose slot 35 is provided in the slidable member 18 to receive the index pin.

The end wall 36 of housing 4 defines a chamber 37 and has a centrally located aperture 38 to permit flow of unfiltered fluid medium from the pressure line inlet 39 into inlet 38a of the filter 7 which is urged against the seal seats 40 by spring 41.

Additional seal means 50 and 51 as shown are provided to render the housing 4 appropriately leakproof.

Housing 4 has formed therein a longitudinally extending passage 42 communicating with the filter discharge chamber 43 and with a restricted passage 44 which communicates with a passage 45, annular passage 45a, a plurality of apertures 45b formed in a ring spacer 30a (FIGURE 3) for supplying a portion of the filtered pressurized fluid medium to chamber 30.

In operation, therefore, the pressurized fluid medium enters chamber 37 through the inlet 39 and flows through the filter 7 while simultaneously exerting filter inlet pressure forces against the end 46 of the movable member 18. The pressurized fluid medium flows through the filter 7 and out the discharge outlet 8. However, a portion of the filtered fluid medium flows through passages 42, 44 and 45 respectively into chamber 30. The springs 27 and 28 are calibrated as aforesaid to seat the flanged end of member 18 against the shoulder 27a provided by the sleeve 17 while pressure forces are initially building up in both chambers 37 and 30 thus preventing flow of the pressurized medium through the by-pass conduit 22.

Inlet pressure therefore is directly applied to the end 46 of the slidable member 18 while filter discharge pressure is applied through the aforementioned passages to the flanged end 19 of the slidable member. When filter inlet and discharge pressures are equal, the slidable member is held closed by the springs 27 and 28 and block the by-pass passage 22.

When, however, a pressure drop is sensed across the filter, for example, caused by plugging of the filter, filter inlet pressure increases in chamber 37 and overcomes the opposing force applied to the flanged end of the slidable member by springs 27 and 28 and the filter discharge pressure forces acting in chamber 30. Thus the filter inlet pressure forces move the slidable member 18 to the right as shown in FIGURE 1 against the combined opposing forces of the springs and filter discharge pressure forces, and thereby urge the flanged end 19 of the slidable member from the shoulder provided by the sleeve 17 to permit limited flow of filtered pressurized fluid medium through the annular recess 21 for discharge through the by-pass outlet 22.

A greater pressure drop in chamber 30 is thereby created and, consequently, the inlet pressure forces acting against the end 46 of the slidable member, then force the member into the full open position as shown in FIGURE 2. The indicating stem element is carried by the slidable member and the brightly colored end thereof is positioned in the recess of the transparent end member thereby providing a visual indication of pressure changes in the equipment which is readily inspectable by the operator of the equipment.

As the slidable member 18 moves to its full open position, the ball detent slips into the cam groove in the slidable member and thereby locks the slidable member in the visual indicating position as shown in FIGURE 2, thus retaining the slidable member in this position until positive steps are taken by the operator to disengage the ball detent.

An important feature of the invention, as above mentioned, is the positive locking feature of the indicating stem and slidable member which requires removal of the filter housing in order to return the slidable member to its original position.

For this purpose, the slot 49 is provided in the guide end of the slidable member, and, after removal of the filter housing, the slidable member may be returned to its original position by the simple expedient of inserting a screwdriver head in the slot and rotating the slidable member whereby the ball detent is thus disengaged and the springs 27 and 28 return the slidable member to its original position. Thus the indicating member is moved from the visual inspection position relative to the transparent end cap.

It will therefore be appreciated that, by my invention, I provide simple and effective means for visual indication of change in pressure conditions in pressure operated equipment which is self-locking and which may be employed in any apparatus operated by pressure media.

Although various minor modifications might be suggested by those versed in the art, it should be understood that I wish to embody within the scope of the patent warranted hereon all such embodiments as reasonably and properly come within the scope of my contribution to the art.

I claim:

1. A fluid differential pressure indicating device comprising: a housing having a transparent wall portion; a by-pass outlet formed in said housing; a stationary sleeve having an aperture communicating with said outlet in said housing; a slidable member in said housing movably responsive to pressure forces acting on opposed first and second end surfaces thereof; an annular flange on said first end surface; means for applying a fluid pressure medium against said second end surface; means for applying a portion of said fluid pressure medium against said first end surface; said flange and said sleeve cooperating for preventing fluid flow through said aperture and said by-pass outlet when pressure forces acting on said opposed end surfaces are substantially equal and for permitting flow through said by-pass outlet when pressure forces acting on said second end surface exceed the pressure forces acting on said first end surface whereby said member is moved to a second position, said member when in said second position permitting visual inspection of said first end through said transparent wall portion, and means for securing said member in said second position.

2. A fluid differential pressure indicating device comprising: a housing having a transparent wall portion; a by-pass outlet formed in said housing; a stationary sleeve in said housing having an aperture communicating with said by-pass outlet; a slidable member in said housing movably responsive to pressure forces acting on opposed first and second end surfaces thereof; means for applying fluid pressure forces against said second end surface; means for applying a portion of said fluid pressure forces against said first end surface; a flange on said first end surface adapted for contact with said sleeve to prevent fluid flow through said outlet when substantially equal pressure forces are acting on the opposed end surfaces of said member, said member being movable to a second position when pressure forces acting on said second end surface exceed the pressure forces acting on said first end surface whereby said flange is moved from contact with said sleeve to thereby permit flow through said by-pass outlet, said member when in said second position permitting visual inspection of said first end surface through said transparent wall portion and means for securing said member in said second position.

3. A fluid differential pressure indicating device comprising: a housing having a transparent wall portion; a by-pass outlet formed in said housing; a stationary sleeve in said housing; a slidable member in said housing having a peripheral annular recess, said member carrying a flange adapted for engagement with said sleeve to prevent fluid flow through said by-pass outlet when pressure forces acting on opposed first and second end surfaces of said member are substantially equal, said member being adapted for movement to a second position to permit flow through said by-pass outlet when pressure forces acting on said second end surface exceed the pressure forces acting on said first end surface, said member while in said second position permitting visual inspection of said first end through said transparent wall portion; means for securing said member in said second position and means for applying fluid pressure against said opposed end surfaces from a common source.

4. A method of visually indicating malfunction in pressure operated apparatus caused by change in operating pressure conditions comprising: positioning a housing having a transparent wall portion in the flow path of the pressurizing medium of said apparatus; forming of a by-pass outlet in said housing; positioning a member movably responsive to pressure forces acting on opposed first and second ends thereof in said housing; applying a portion of operating pressure medium to each of said opposed ends for positioning said member to prevent pressure medium flow through said by-pass outlet when said opposing pressure forces are substantially equal, said member being movable to a second position for permitting flow through said by-pass outlet when pressure forces acting on said second end exceed pressure forces acting on said first end, said first end being visually inspectable through said transparent wall portion when said member is in said second position, and providing means actuatably responsive to the relative position of the member for locking said member in said second position.

5. A fluid differential pressure indicating device comprising: a housing defining a chamber communicating with a pressurized fluid inlet and outlet; a member movable from a first hidden position to a second visual position in the chamber in response to pressure applied thereagainst, said member separating said chamber into first and second pressurized fluid compartments and said first compartment communicating with said inlet; a transparent wall portion in said housing for visual observation of said second compartment; conduit means interconnecting said compartments for applying pressurized fluid against opposed compartment defining ends of the member to maintain the member in said first position, said member being movable to said second position in said second compartment in response to a greater pressure applied thereagainst by the pressurized fluid in the first compartment that applied thereagainst by the pressurized fluid in the second compartment for visual observation of the member through the transparent wall portion, and a pressurized fluid by-pass outlet in said housing normally closed by the member in said first position and opened when the member is in the second position.

6. A fluid differential pressure indicating device comprising: a housing defining a chamber communicating with a pressurized fluid inlet and outlet; a member movable from a first hidden position to a second visual position in the chamber in response to pressure applied against opposed first and second end surfaces thereof, said member separating said chamber into first and second pressurized fluid compartments and said first compartment communicating with said inlet; a transparent wall portion in said housing for visual observation of said second compartment; conduit means interconnecting said compartments for applying pressurized fluid against the first and second end surfaces of the member to maintain the member in said first position, said member being movable to said second position in said second compartment in response to a greater pressure applied against said first end surface by the pressurized fluid in the first compartment than applied by the pressurized fluid against the second end surface in the second compartment for visual observation of the member through the transparent wall portion, and a pressurizing fluid by-pass outlet in said housing normally closed by the member in said first position and opened when the member is in the second position.

7. A fluid differential pressure indicating device comprising: a housing defining a chamber communicating with a pressurized fluid inlet and outlet; a slidable member movable from a first hidden position to a second visual position in the chamber in response to pressure applied against opposed first and second end surfaces thereof, said member separating said chamber into first and second pressurized fluid compartments and said first compartment communicating with said inlet; a transparent wall portion in said housing for visual observation of said second compartment; conduit means interconnecting said compartments for applying pressurized fluid against the second end surface of the member to maintain the member in the first position, said member being movable to said second position in said second compartment in response to a greater pressure applied against said first end surface by the pressurized fluid in the first compartment than applied by the pressurized fluid against the second end surface of the member in the second compartment for visual observation of the member through the transparent wall portion, and a pressurized fluid by-pass outlet in the housing normally closed by the member in said first position and opened when the member is in the second position.

8. A fluid differential pressure indicating device comprising: a housing defining a chamber communicating with a pressurized fluid inlet and outlet; a stationary sleeve in the chamber; a member in the sleeve movable from a first hidden position to a second visual position in the chamber in response to pressure applied thereagainst, said member separating said chamber into first and second pressurized fluid compartments and said first compartment communicating with said inlet; a transparent wall portion in said housing for visual observation of said second compartment; conduit means interconnecting said compartments for applying pressurized fluid against opposed compartment-defining ends of the member to maintain the member in said first position, said member being movable to said second position in the second compartment in response to a greater pressure applied thereagainst by the pressurized fluid in the first compartment than applied thereagainst by the pressurized fluid in the second compartment for visual observation of the member through said transparent wall portion, and a pressurized fluid outlet in said housing normally closed by the member in the first position and opened when the member is in the second position.

9. A fluid differential pressure indicating device comprising: a housing defining a chamber communicating with a pressurized fluid inlet and outlet; a stationary sleeve in said housing having an aperture therein, a member in said sleeve movable from a first hidden position to a second visual position in the chamber in response to pressure applied thereagainst, said member separating said chamber into first and second pressurized fluid compartments and said first compartment communicating with said inlet, a transparent wall portion in said housing for visual observation of said second compartment; conduit means interconnecting said compartments for applying pressurized fluid against opposed compartment-defining ends of the member to maintain the member in said first position, said member being movable to said second position in said second compartment in response to a greater pressure applied thereagainst by the pressurized fluid in the first compartment than applied thereagainst by the pressurized fluid in the second compartment for visual observation of the member through the transparent wall portion, and a pressurized fluid by-pass outlet in said housing communicating with the aperture of the sleeve, said sleeve aperture and by-pass outlet normally closed by the member in the first position and opened when the member is in the second position.

10. A fluid differential pressure indicating device comprising: a housing defining a chamber communicating with a pressurized fluid inlet and outlet; a member movable from a first hidden position to a second visual position in the chamber in response to pressure applied thereagainst, said member separating said chamber into first and second pressurized fluid compartments and said first compartment communicating with said inlet; a transparent wall portion in said housing for visual observation of said second compartment; conduit means interconnecting said compartments for applying pressurized fluid against the member to maintain the member in said first position, said member being movable to said second position in said second compartment in response to a greater pressure applied thereagainst by pressurized fluid in the first compartment than applied thereagainst by the pressurized fluid in the second compartment for visual observation of the member through the transparent wall portion; a pressurized fluid by-pass outlet in said housing normally closed by the member in said first position and open when the member is in the second position, and means for securing the member in the second position.

11. A fluid differential pressure indicating device comprising: a housing defining a chamber communicating with a pressurized fluid inlet and outlet; a member movable from a first hidden position to a second visual position in the chamber in response to pressure applied thereagainst, said member separating said chamber into first and second pressurized fluid compartments and said first compartment communicating with said inlet; a transparent wall portion in said housing for visual observation of said second compartment; conduit means interconnecting said compartments for applying pressurized fluid against the member to maintain the member in the first position, the member being movable to the second position in the second compartment in response to a greater pressure applied thereagainst by the pressurized fluid in the first compartment than applied thereagainst by the pressurized fluid in the second compartment for visual observation of the member through the transparent wall portion; a pressurized fluid by-pass outlet in said housing normally closed by the member in the first position and opened when the member is in the second position, and a manually releasable locking device for securing the member in the second position.

References Cited in the file of this patent

UNITED STATES PATENTS

| 2,669,707 | Ehrman | Feb. 16, 1954 |
| 2,935,040 | Steensen | May 3, 1960 |